Figure 1:
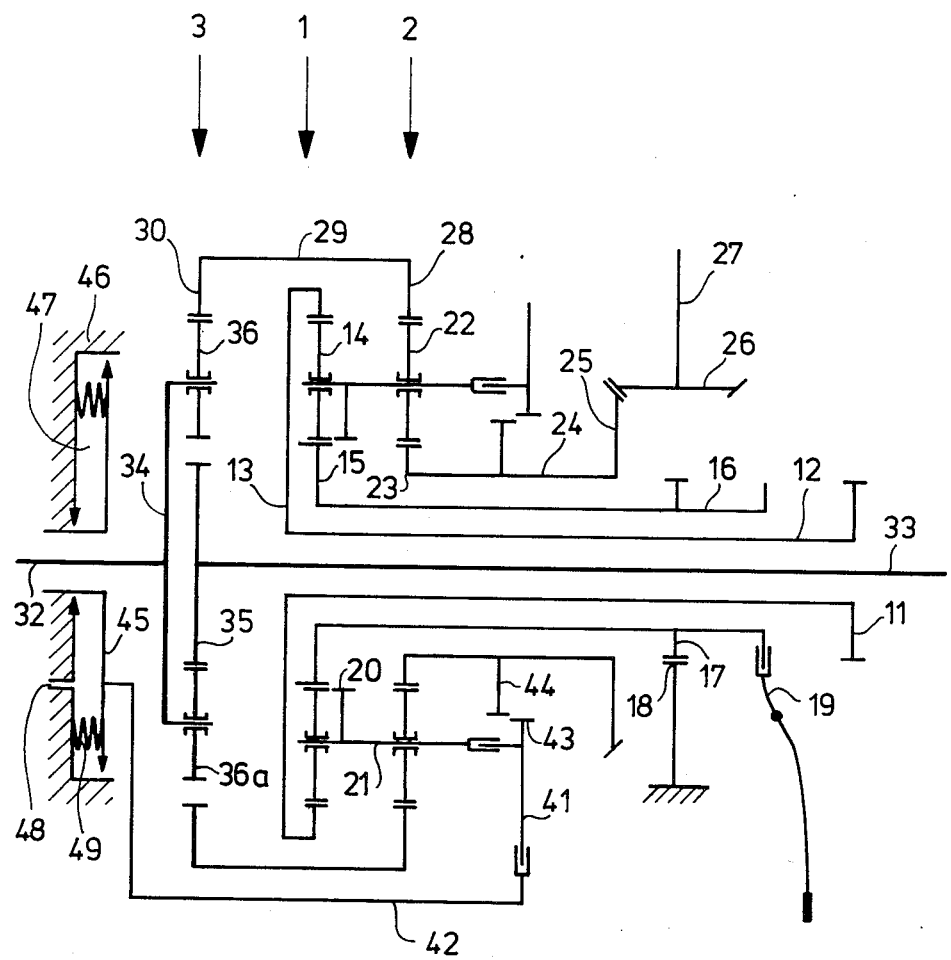

United States Patent [19]

Rühle

[11] Patent Number: 4,612,824
[45] Date of Patent: Sep. 23, 1986

[54] TRANSMISSION SYSTEM

[75] Inventor: Günter Rühle, Bietigheim-Bissingen, Fed. Rep. of Germany

[73] Assignee: GETRAG Getriebe-und Zahnradfabrik GmbH, Fed. Rep. of Germany

[21] Appl. No.: 680,132

[22] Filed: Dec. 10, 1984

[30] Foreign Application Priority Data

Dec. 15, 1983 [DE] Fed. Rep. of Germany ....... 3345322

[51] Int. Cl.⁴ ............................................. F16H 37/06
[52] U.S. Cl. ................................ 74/665 F; 74/710.5; 74/714
[58] Field of Search ............... 180/247; 74/710.5, 714, 74/665 F, 665 H, 665 K, 767

[56] References Cited

U.S. PATENT DOCUMENTS

| | | | |
|---|---|---|---|
| 3,383,953 | 5/1968 | Christenson | 74/714 |
| 3,405,574 | 10/1968 | Livezey | 74/710.5 |
| 4,449,604 | 5/1984 | Suzuki | 180/247 |
| 4,457,394 | 7/1984 | Suzuki | 180/247 |

FOREIGN PATENT DOCUMENTS 1103152  3/1961  Fed. Rep. of Germany ..... 74/710.5
2074517 11/1981  United Kingdom .

Primary Examiner—Lawrence Staab
Assistant Examiner—Martin G. Belisario
Attorney, Agent, or Firm—Kanz, Scherback and Timmons

[57] ABSTRACT

A transmission system, in particular for motor vehicles having at least two driven axles, comprises a transmission (1) and two differentials (2, 3) in tandem arrangement, of which at least the transmission (1) is designed as planetary gear. All three gears (1, 2, 3) are arranged coaxially. An arrangement requiring exceptionally little space is obtained when the differentials (2, 3) are likewise designed as planetary gears and when the transmission (1) is arranged between the two differentials (2, 3). The transmission comprises two coaxially arranged hollow shafts (12, 16) passing through the differential (2) following the transmission, and the transmission and the differential (2) have a common planet carrier (21). The two differentials are coupled by the fact that their internal gears (28, 30) are mounted on a common hollow body (29) embracing the transmission (1).

5 Claims, 2 Drawing Figures

TRANSMISSION SYSTEM

The present invention relates to a transmission system, in particular for motor vehicles having at least two driven axles, comprising two differentials in tandem arrangement whose differential cases are mounted to rotate about a common main axis, and a two-stage transmission mounted upstream of the said differentials to rotate about the same axis as the two differentials and designed as a planetary gear whose internal gear is seated on a first hollow shaft, whose planet carrier is connected with the differential case—formed by the planet carrier—of the neighboring differential which is likewise designed as planetary gear, whose sun gear is seated on a second hollow shaft extending coaxially relative to the said first hollow shaft, and whose gear shift arrangement permits one part of the planetary gear to be connected selectively with a component fixed to the case or another component of the planetary gear.

A transmission system of this type has been known from GB Patent Disclosure No. 20 74 517. It comprises two differentials, one of them being designed as planetary gear, and a transmission likewise designed as planetary gear and arranged in the axial direction beside the two differentials which are also disposed one beside the other. The gear shift means for operating the manual transmission comprise a gear shift sleeve arrangement disposed axially beside the gear set proper. This known transmission system has a considerable extension in the axial direction which makes its use in small passenger cars with transversely arranged engine somewhat problematic.

There has been known from French Patent of Addition No. 94 265 a transmission system comprising two coaxially arranged differentials designed as planetary gears. The known arrangement does, however, comprise no additional transmission, but only sort of a differential lock. This lock is not incorporated in the actual transmission system, but provided on an extension of the common shaft of the two planetary gears, similar to the transmission system of GB Patent Disclosure No. 20 74 517 where the transmission is disposed beside the coaxially arranged differentials. Here again, the axial length of the transmission system is quite considerable, and even increased by a transmission provided in coaxial arrangement.

Now, it is the object of the present invention to improve a transmission system of the type described above so as to reduce its spac requirements.

According to the present invention, this object is achieved in that both differentials are designed as planetary gears and that the transmission is disposed between the two differentials in such a manner that the coaxially arranged hollow shafts of the transmission pass through the first one of the two differentials and the planet carrier of the transmission is connected with the planet carrier of the said first differential, while the internal gears of the two differentials are mounted on a common hollow body embracing the transmission, and that the second hollow shaft carrying the sun gear of the transmission embraces the first hollow shaft carrying the internal gear of the said transmission and can be displaced in the axial direction between a first position in which it is in engagement with a part fixed on the case for rotation therewith, and a second position in which it is in engagement with the planet carrier for rotation therewith.

Due to the fact that all gears are designed as planetary gears and that the transmission is provided between the two differentials, an extremely compact arrangement is obtained in the axial direction which enables extremely small transmission systems to be built which are well suited also for use in small passenger cars with all-wheel drive and transversely arranged engine. Apart from the fact that by providing the transmission between the differentials the different elements of the transmission system can be arranged extremely close to, and can partly even be united with, each other it is a particular advantage of this arrangement that the gear shift means for operating the transmission is substantially incorporated in the transmission system and does not require any notable additional space.

The transmission system of the invention may be provided also without any difficulty with a differential lock for one or both differentials. In particular, a differential lock may be provided for the differential coupled with the transmission, which in the case of motor vehicles serves to split the torque between two vehicle axles, while the second differential serves to split the torque supplied to it between the driving wheels belonging to one axle.

In a preferred embodiment of the invention in which all gears are designed as planetary gears, the differential lock is formed by a displaceable coupling element which in one of its positions provides a non-rotating connection between the planet carrier and the sun gear of the first differential. The said coupling element may be connected with a piston which extends coaxially to the main shaft and seals off a chamber connected to a vacuum line so that the differential lock can be engaged simply by exposing the said chamber to the vacuum generated by the engine of a motor vehicle. Releasing of the differential lock can then be effected simply by shutting off the line to release the vacuum and returning the coupling element to its initial, inoperative position by means of previously tensioned pressure means, preferably springs.

The invention will be described and explained hereafter in detail with reference to the embodiment shown in the drawing. The features described in the specification and apparent from the drawing may be employed in other embodiments of the invention either alone or in any desired combination thereof. In the drawing, FIG. 1 is a diagrammatic representation of a transmission system according to the invention; and FIG. 2 shows a longitudinal section through a transmission system according to the diagram of FIG. 1.

Figure 2:
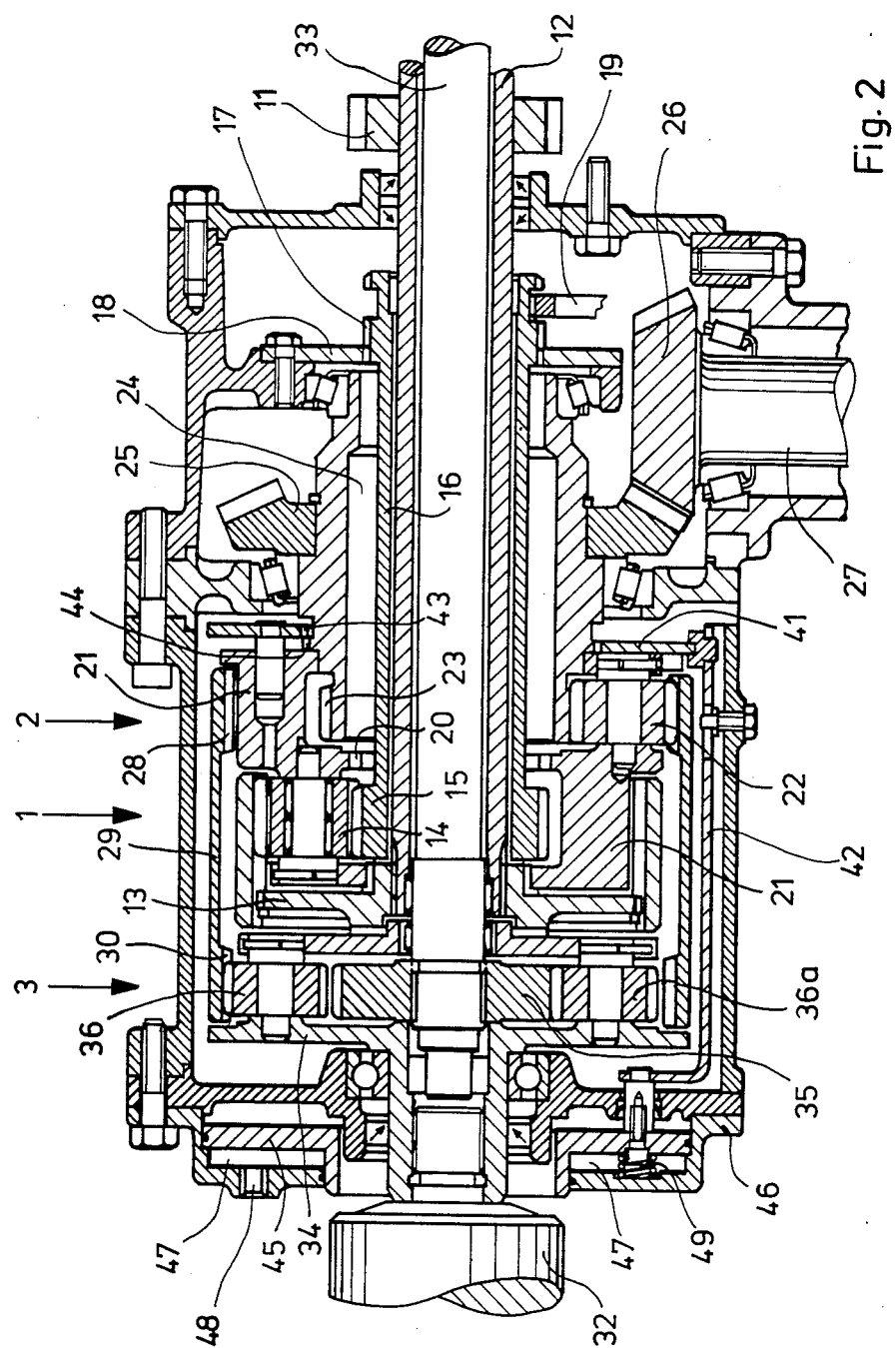

The following description refers to FIGS. 1 and 2 in which one and the same transmission system is shown. In the diagrammatic representation of FIG. 1, all mounting points on the case have been omitted. Parts of the case are indicated only to the extent they play a part in the operation of the transmission system.

The transmission system shown in the drawing comprises three coaxially arranged planetary gears, i.e. a transmission 1 and two differentials 2 and 3. Power is introduced via a gear 11 mounted on one end of a first hollow shaft 12, the other end of which carries the internal gear 13 of the transmission 1. The planet gears 14 of the transmission engage in the usual manner a sun gear 15 mounted on one end of a second hollow shaft 16 which embraces concentrically the said first hollow shaft 12. A gear 17 provided near the other end of a second hollow shaft 16 is in engagement, in the position of the hollow shaft 16 shown in the drawing, with a toothing or gear 18 fixed to the case so that the sun gear 15 is stationary in this position. The second hollow shaft 16 is mounted for axial displacement and can be disengaged from the position shown in the drawing by means of a shift fork 19 whereby its engagement with the stationary toothing 17 is released and a toothing 20 provided on the planet carrier 21 is engaged instead so that the planet gears 14 are connected with the planet carrier 21 to rotate therewith. Consequently, the planet gears 14 also can no longer roll on the internal gear 13 so that a rigid connection between the internal gear 13 and the planet carrier 21 is obtained, which corresponds to a transmission gear ratio of 1:1. If, however, the sun gear 15 is retained against rotation in the before-described position of the second hollow shaft 16, the planet carrier 21 rotates at a speed lower than the driven internal gear 13 so that a speed reduction is obtained. In the case of a road vehicle, for example, the first condition is suited for road operation while the other condition is suited for off-road operation. The planet carrier 21 of the transmission 1 serves at the same time as planet carrier of the first differential 2. Accordingly, the transmission of torque from the transmission 1 to the first differential 2 is effected via the said common planet carrier 21. The planet gears 22 belonging to the differential 2 are in engagement with a sun gear 23 provided on the end of a third hollow shaft 24 extending coaxially around the before-mentioned hollow shafts 12 and 16 and carrying on its other end a bevel gear 25 engaging a bevel gear 26 mounted on the end of a power take-off shaft 27 which may, for example, lead to the differential of another axle. The internal gear 28 of the said first differential 2 is disposed within a cylindrical hollow body 29 embracing substantially the three planetary gears and in particular the central transmission and carrying on its other end the internal gear 30 of the second differential 3 so as to transmit the torque supplied by the first differential to the planet gears 36, 36a of the second differential 3. The gears of the differential 2 may be selected to ensure that torques of different value are transmitted via the sun gear 23 to the power take-off shaft 27 on the one hand and via the internal gear 28 to the second differential 3 on the other hand. In the practical embodiment of the invention shown in FIG. 2, the torque-splitting ratio between the second differential intended to drive the front axle and the power take-off shaft 27 leading to the rear axle is 63.6:36.4.

The second differential 3 serves to transmit the torques to two shafts 32 and 33 of which the first one is connected with the planet carrier 34 while the other one is connected with the sun gear 35 of the same differential. In this case, the arrangement is such that the same torque is transmitted to the two shafts 32 and 33 from the internal gear 30 via the planet gears 36, 36a and the planet carrier 34 and/or the sun gear 35. As mentioned before, these two shafts serve to drive the front wheels of a motor vehicle in the embodiment shown in FIG. 2.

The embodiment shown in the drawing comprises as a special feature a differential lock for the first differential 2 which in the embodiment shown serves to split the torque between two vehicle axles. To this end, the planet carrier 21 which is common to the transmission 1 and the first differential 2 is provided with a shift disk 41 which can be displaced in axial direction relative to the planet carrier 21 by means of a torque rod 42 and which comprises an internal toothing 43 which can be engaged, by displacing the shift disk 41, with a toothed rim 44 provided on the periphery of the third hollow shaft 24 carrying the sun gear 23 of the first differential 2. In this manner, a rigid connection is realized between the gears of the first differential, whereby the latter is rendered inoperative.

In order to facilitate the engagement of the differential lock, the torque rod 42 is connected in the embodiment shown with a piston 45 which extends coaxially relative to the main shaft and which seals off a chamber 47 provided in the case 46 and equipped with a connection 48 for a vacuum line. The latter may be connected in the usual manner with the intake system of the engine of a motor vehicle, as in other servo systems. Now, when a vacuum condition is produced in the chamber 47 by operation of a switch or the like, the piston 45 is moved in a direction in which the toothing 43 comes into engagement with the toothed rim 44 on the third hollow shaft 24, whereby the differential lock is engaged. When the vacuum condition in the chamber 47 is released, the piston 45 is returned to its initial position by helical pressure springs 49 arranged in the chamber whereby the differential lock is disengaged.

It goes without saying that the invention is not limited to the embodiment shown, but that deviations therefrom are possible without departing from the scope of the invention. In particular, the invention is not limited to arrangements in which all differentials are designed as planetary gears. Further, the transmission may also be arranged laterally beside the differentials. Possibilities of this type are offered by the transmission systems of the prior Patent Application No. 33 11 175.8 where the planet gears of the transmission could be connected with the differential case of the first differential.

I claim:

1. A transmission system for motor vehicles having at least two driven axles, comprising a transmission system case containing, first and second differentials each including planetary gears, a sun gear, an internal gear and a planet gear carrier, a two stage transmission including planetary gears, a sun gear, an internal gear and a planet gear carrier, said two-stage transmission being located between said first and second differentials, first and second hollow shafts concentrically arranged one with respect to the other and extending through one of said differentials and said planet carrier of said transmission, means connecting said planet carrier of said transmission with said planet carrier of said one of said differentials, a hollow body for containing said transmission, said internal gears of said first and second differentials being mounted to an inner surface of said hollow body, said sun gear of said transmission being mounted to said second hollow shaft, said internal gear of said transmission being mounted to said first hollow shaft, a gear fixed to said case, and means for shifting said second hollow shaft between a first position where it is coupled to said gear fixed to said case to lock said sun gear of said transmission and a second position in rotatable engagement with said planet carrier of said transmission.

2. The transmission system of claim 1 in which said one of said differentials is provided with a differential lock.

3. The transmission system of claim 2 in which said differential lock comprises a displaceable coupling element moveable to effect a non-rotating connection between said planet carrier and said sun gear of said one of said differentials.

4. The transmission system of claim 3 including a vacuum operated piston and wherein said displaceable element is mechanically connected to said piston.

5. The transmission system of claim 1 in which said planet carrier of said transmission and said planet carrier of said one of said differentials is provided by a common component.

* * * * *